(12) United States Patent
Parekh et al.

(10) Patent No.: US 6,235,102 B1
(45) Date of Patent: May 22, 2001

(54) COATING COMPOSITION FOR METAL SUBSTRATES CONTAINING AN ACRYLATE COPOLYMER HAVING PENDANT GLYCIDYL GROUPS AND AN ACID-TERMINATED POLYESTER

(75) Inventors: Girish G. Parekh, Libertyville, IL (US); Lawrence P. Seibel, Kenosha, WI (US)

(73) Assignee: The Valspar Corporation, Minneapolis, MN (US)

( * ) Notice: Subject to any disclaimer, the term of this patent is extended or adjusted under 35 U.S.C. 154(b) by 0 days.

(21) Appl. No.: 09/265,188

(22) Filed: Mar. 9, 1999

(51) Int. Cl.$^7$ .......................... C09D 137/00; C08L 37/00; C08L 67/02
(52) U.S. Cl. .................. 106/287.22; 106/311; 106/400; 106/436; 106/437; 524/513; 524/548; 524/561; 525/176; 525/327.3; 525/386
(58) Field of Search ..................................... 525/176, 190, 525/327.3, 386; 106/311, 400, 437, 436, 287.22; 524/513, 548, 561

(56) References Cited

U.S. PATENT DOCUMENTS

| 4,681,811 | * | 7/1987 | Simpson et al. | 428/413 |
| 4,737,403 | * | 4/1988 | Simpson et al. | 428/273 |
| 4,764,430 | * | 8/1988 | Blackburn et al. | 428/413 |
| 4,927,868 | * | 5/1990 | Schimmel et al. | 523/439 |

* cited by examiner

Primary Examiner—Donald R. Wilson
Assistant Examiner—Kelechi Egwim
(74) Attorney, Agent, or Firm—Marshall, O'Toole Gerstein, Murray & Borun

(57) ABSTRACT

A coating composition for application to primed metal substrates as a topcoat is disclosed. The coating composition is especially useful on metal closures for vacuum-packed food products. The coating composition is free of a halide-containing vinyl polymer and comprises: (a) an acrylate copolymer having pendant glycidyl groups, (b) an acid-terminated polyester, and (c) a nonaqueous carrier.

31 Claims, No Drawings

COATING COMPOSITION FOR METAL SUBSTRATES CONTAINING AN ACRYLATE COPOLYMER HAVING PENDANT GLYCIDYL GROUPS AND AN ACID-TERMINATED POLYESTER

FIELD OF THE INVENTION

The present invention relates to coating compositions for metal substrates, methods of coating a metal substrate, and metal articles having a coating composition applied thereon. The coating composition comprises: (a) an acrylate copolymer having pendant glycidyl groups and (b) an acid-terminated polyester in (c) a nonaqueous carrier, and is free of a halide-containing vinyl polymer. The coating composition, after curing, is useful as a topcoat for the interior of metal closures and demonstrates excellent flexibility and excellent adhesion to primer coats and to plastisol gaskets.

BACKGROUND OF THE INVENTION

It is well known that an aqueous solution in contact with an untreated metal substrate can result in corrosion of the untreated metal substrate. Therefore, a metal article, such as a metal closure or container for a water-based product, like a food or beverage, is rendered corrosion resistant in order to retard or eliminate interactions between the water-based product and the metal article. Generally, corrosion resistance is imparted to the metal article, or to a metal substrate in general, by passivating the metal substrate or by coating the metal substrate with a corrosion-inhibiting coating.

Investigators continually have sought improved coating compositions that reduce or eliminate corrosion of a metal article and that do not adversely affect an aqueous product packaged in the metal article. For example, investigators have sought to improve the imperviousness of the coating in order to prevent corrosion-causing ions, oxygen molecules, and water molecules from contacting and interacting with a metal substrate. Imperviousness can be improved by providing a thicker, more flexible, and more adhesive coating, but often improving one particular advantageous property is achieved at the expense of another advantageous property.

In addition, practical considerations limit the thickness, adhesive properties, and flexibility of a coating applied to a metal substrate. For example, thick coatings are expensive, require a longer cure time, can be esthetically unpleasing, and can adversely affect the process of stamping and molding the coated metal substrate into a useful metal article. Similarly, the coating should be sufficiently flexible such that the continuity of the coating is not destroyed during stamping and molding of the metal substrate into the desired shape of the metal article.

Investigators also have sought coatings that possess chemical resistance in addition to corrosion inhibition. A useful coating for the interior of a metal closure or container must be able to withstand the solvating properties of the packaged product. If the coating does not possess sufficient chemical resistance, components of the coating can be extracted into the packaged product and adversely affect the product. Even small amounts of extracted coating components can adversely affect sensitive products, such as beer, by imparting an off-taste to the product.

Organic solvent-based coating compositions provide cured coatings having excellent chemical resistance. Such solvent-based compositions include ingredients that are inherently water insoluble, and, thereby, effectively resist the solvating properties of water-based products packaged in the metal container.

Epoxy-based coatings and polyvinyl chloride-based coatings have been used to coat the interior of metal closures and containers for foods and beverages because these coatings exhibit an acceptable combination of adhesion, flexibility, chemical resistance, and corrosion inhibition. Polyvinyl chloride-based coatings and vinyl acetate/vinyl chloride copolymer-based (i.e., solution vinyl) coatings also have been the topcoat of choice for the interior of metal closures because these coatings provide excellent adhesion to plastisol sealer gaskets applied over the cured topcoat. However, epoxy-based coatings and polyvinyl chloride-based coatings have serious disadvantages that investigators still are attempting to overcome.

For example, polyvinyl chloride-based coating compositions are thermoplastic. Thermoplastic coatings used as the topcoat of the interior coating of metal closures have inherent performance disadvantages, such as potential softening during the closure manufacturing process or under food processing conditions. Therefore, coating compositions having a thermosetting character have been investigated.

In addition, coatings based on polyvinyl chloride or a related halide-containing vinyl polymer, like polyvinylidene chloride, possesses the above-listed advantageous properties of chemical resistance and corrosion inhibition, and are economical. However, curing a polyvinyl chloride or related halide-containing vinyl polymer can generate toxic monomers, such as vinyl chloride, a known carcinogen. In addition, the disposal of a halide-containing vinyl polymer, such as by incineration, also can generate toxic monomers. The generated vinyl chloride thereby poses a potential danger to workers in metal can and closure manufacturing plants, in food process and packaging plants, and at disposal sites. Disposal of polyvinyl chloride and related polymers also can produce carcinogenic dioxins and environmentally harmful hydrochloric acid.

Government regulators are acting to eliminate the use of polyvinyl chloride-based coating compositions that contact food, and thereby eliminate the environmental and health concerns associated with halide-containing vinyl polymers. Presently, however, polyvinyl chloride-based compositions are still used to coat the interior of food and beverage containers and closures.

To overcome the environmental concerns and performance problems associated with polyvinyl chloride-based coating compositions, epoxy-based coating compositions recently have been used to coat the interior of food and beverage containers. However, epoxy-based coatings also possess disadvantages. For example, epoxy-based coating compositions are more expensive than polyvinyl chloride-based coating compositions.

In addition, epoxy-based coatings are prepared from monomers such as bisphenol A and bisphenol A diglycidyl ether (BADGE), for example.

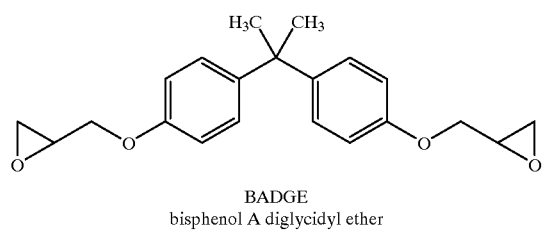

BADGE
bisphenol A diglycidyl ether

-continued

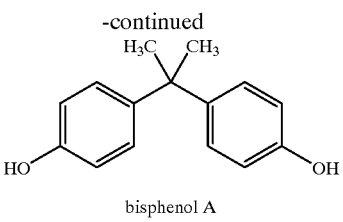
bisphenol A

Epoxy resins have a serious disadvantage in that residual amounts of glycidyl ether and bisphenol monomers are present in the resin, typically in an amount of about 0.5% by weight. The presence of such monomers, and especially a glycidyl ether monomers, raises serious environmental and toxicological concerns, especially because a glycidyl ether monomer can be extracted from a cured coating on the interior of a metal container by a product stored in the container. Accordingly, regulatory agencies have promulgated regulations reducing the amount of a glycidyl ether monomer in coating compositions, and especially coating compositions used on the interior of food and beverage containers.

Coating compositions also typically include a phenolic resin. Phenolic resins prepared from bisphenol A or similar bisphenols also can contain residual bisphenol monomers, similar to epoxy-based coatings. Phenolic resins also have disadvantages in that the resins can generate formaldehyde, which can adversely affect a product stored in a coated metal container. Accordingly, it would be an advance in the art to overcome the problems and disadvantages associated with coating compositions for metal substrates that contain an epoxy resin, a halide-containing vinyl polymer, and/or a phenolic resin.

With respect to a metal closure for a food container, the interior of a metal closure conventionally can be coated with three separate coating compositions, i.e., a three-coat system. First, an epoxy/phenolic primer is applied to the metallic substrate and cured, then a vinyl-based middle coat is applied over the cured primer. Finally, after curing the middle coat, a specially formulated topcoat capable of adhering to a plastisol sealer is applied over the cured middle coat. The plastisol sealer is applied over the cured topcoat, and formed into a gasket during manufacture of a metal closure from a metal sheet having the three cured layers of coatings applied thereon.

Two-coat systems are the primary commercial system, but also exhibit disadvantages. Investigators are attempting to develop an improved two-coat system for coating the interior of a metal closure. An ideal two-coat system maintains corrosion inhibition, lowers the cost of applying the coatings, has improved rheological properties, has improved cured film integrity, is free of a polyvinyl chloride-based resin, residual bisphenol monomers, and residual glycidyl ether monomers. In addition, it would be desirable to provide a top coat that acts as a barrier against the migration of bisphenol and glycidyl ether monomers from an epoxy resin-based primer coat.

A two-coat system for the interior of metal food closure comprises a primer (i.e., a size) and a topcoat. The metal closures typically are used in conjunction with a glass or plastic container. The topcoat must have sufficient adhesion to the primer or the coating will fail. In order to achieve sufficient intercoat adhesion, the chemical makeup of the topcoat often was dictated by the chemical makeup of the primer. Investigators, therefore, have been seeking a more "universal" topcoat, i.e., a topcoat that can be applied to a variety of different primers and that exhibits sufficient intercoat adhesion. Such a universal topcoat would be a significant advance in the art.

The coatings used on the interior of a metal food closure also must meet other criteria in addition to performance. For example, the coatings must incorporate components acceptable to the U.S. Food and Drug Administration (FDA) because the cured coating composition contacts food products.

The cured primer and topcoat, therefore, require sufficient adhesion to maintain film integrity during closure fabrication. The cured primer and topcoat also require sufficient flexibility to withstand closure fabrication. Sufficient coating adhesion and flexibility also are needed for the closure to withstand processing conditions the closure is subject to during product packaging.

Other required performance features of the cured coatings include corrosion protection and adequate adhesion to the plastisol gasket applied over the cured topcoat. Also, the cured coating composition requires sufficient chemical resistance and sufficient abrasion and mar resistance.

In the manufacture of a metal closure, a metal sheet is coated with the coating compositions, and each coating is cured individually, then the metal sheet is formed into the shape of a metal closure. The closures are made in a variety of sizes ranging from 27 mm (millimeter) to 110 mm in diameter. During manufacture, a plastisol material is applied over the cured coatings on the interior of the metal closure. This plastisol subsequently is formed into a gasket and cured. The gasket ensures an effective seal between the metal closure and glass container, and to maintain the vacuum condition of the packaged food product.

Product packaging is performed under processing conditions wherein the plastisol gasket is softened. When the metal closure is pressed onto the glass container, the threads on the glass container form impressions in the softened plastisol gasket. The metal closure is secured in place both by the thread impressions and by the vacuum produced by subsequent cooling. This type of metal closure is used for baby food containers and for other packaged food and beverage products, such as juices and gravies. Other types of closures are designed to be secured to glass containers by lugs rather than by thread impressions in the plastisol.

Vinyl chloride-based topcoat compositions have been softened both by product processing conditions, and by conditions encountered during closure manufacture, thereby leading to closure failure. The present invention is directed, in part, to overcoming such closure failures.

Investigators, therefore, have sought a two-coat system for the interior of metal closures used for vacuum-packed food products. Investigators have particularly sought a vinyl halide-free topcoat for the interior of metal closures for food and beverages that retains the advantageous properties of a vinyl chloride-based topcoat, such as adhesion, flexibility, chemical resistance, corrosion inhibition, and favorable economics. Investigators especially have sought a coating composition that demonstrates these advantageous properties and also reduces the environmental and toxicological concerns associated with halide-containing vinyl polymers, formaldehyde, and residual glycidyl ether and bisphenol monomers.

Two-coat systems have been investigated and used for application to the interior of metal closures. Investigators sought and used topcoat compositions having a sufficiently flexible cured coating such that a coated metal substrate can be deformed without destroying film continuity. This is an important property because the metal substrate is coated prior to deforming, i.e., shaping, the metal substrate into a metal article, like a metal closure. Coating a metal substrate prior to shaping the metal substrate is the present standard industrial practice.

A present topcoat coating composition includes: (a) an acrylate copolymer having pendant glycidyl groups, typically a glycidyl (meth)acrylate-alkyl (meth)acrylic copolymer, and (b) an acid-terminated polyester, wherein the composition is free of a halide-containing vinyl polymer, and which, after curing, demonstrates: (1) excellent flexibility, (2) excellent adhesion to the primer coat, (3) excellent chemical resistance and corrosion inhibition, (4) excellent adhesion to the plastisol gasket, and (5) reduced environmental and toxicological concerns.

As an added advantage, a present topcoat coating composition is an improved two-coat system, thereby eliminating the presence of a halide-containing vinyl polymer and the presence of residual bisphenol and glycidyl ether monomers, while providing an effective barrier against migration of residual bisphenol and glycidyl ether monomers from the size coat. The present topcoat coating composition also can be used with a variety of types of primers without a significant decrease in coating properties.

SUMMARY OF THE INVENTION

The present invention is directed to a coating composition that, after curing, effectively inhibits corrosion of metal substrates, is flexible, and exhibits excellent adhesion both to a primer coat and to a variety of plastisol gaskets used to ensure the vacuum seal of a metal closure to a glass container. The present coating composition comprises: an acrylate copolymer having pendant glycidyl groups and an acid-terminated polyester in a nonaqueous carrier. The present coating composition also is free of (a) a halide-containing vinyl polymer, such as polyvinyl chloride, (b) formaldehyde, and (c) glycidyl ether and bisphenol monomers, such as BADGE and bisphenol A, used in the preparation of an epoxy resin. Nevertheless, after curing and crosslinking, the coating compositions demonstrate excellent adhesion both to a primer coat and to a plastisol gasket.

The coating composition effectively inhibits corrosion of ferrous and nonferrous metal substrates when the composition is applied as a topcoat to a metal substrate, then cured for a sufficient time and at a sufficient temperature to provide a crosslinked coating. A cured and crosslinked coating demonstrates sufficient chemical and physical properties for use as the topcoat of a two-coat system on the interior of metal closures used in packaging foods and beverages. The coating composition does not adversely affect products packaged in a container having a metal closure coated on the interior surface with the cured composition.

In particular, the present coating composition comprises: (a) about 50% to about 90%, by weight of nonvolatile material, of an acrylate copolymer having pendant glycidyl groups, for example, a glycidyl (meth)acrylate-alkyl (meth) acrylate copolymer and (b) about 10% to about 50%, by weight of nonvolatile material, of an acid-terminated polyester, wherein the composition is free of a halide-containing vinyl polymer. The weight ratio of glycidyl-containing monomers, e.g., glycidyl methacrylate, to alkyl (meth)acrylate in the copolymer is about 1:1 to about 1:20.

Components (a) and (b) are dispersed in a nonaqueous carrier such that the total coating composition includes about 20% to about 80%, by weight of the total composition, of components (a) and (b). Other optional components, such as a curing catalyst, a pigment, a filler, or a lubricant, also can be included in the composition, and, accordingly, increase the weight percent of total nonvolatile material in the composition to above about 80% by weight of the total coating composition.

As used here and hereinafter, the term "coating composition" is defined as the composition including the acrylate copolymer having pendant glycidyl groups, alkyl (meth) acrylate copolymer, the acid-terminated polyester, and any optional ingredients dispersed in the nonaqueous carrier. The term "cured coating composition" is defined as the adherent polymeric coating resulting from curing a coating composition. The cured coating composition comprises the acrylate copolymer having pendant glycidyl groups-alkyl (meth)acrylate copolymer and the acid-terminated polyester essentially in the amounts these ingredients are present in the coating composition, expressed as nonvolatile material.

Therefore, one important aspect of the present invention is to provide a coating composition that enhances the ability of the primer to inhibit corrosion of ferrous and nonferrous metal substrates. After application to a primed metal substrate as a topcoat, and subsequent curing at a sufficient temperature for a sufficient time, the coating composition provides an adherent layer of a cured coating composition. The cured coating composition enhances corrosion inhibition, has excellent flexibility, and exhibits excellent adhesion both to a variety of different of primer types applied to the metal substrate and to a variety of different types of plastisol sealer gaskets applied over the cured coating composition.

Because of these properties, an improved two-coat system is available for application to the metal substrate thereby providing economies in time, material, and machinery in the coating of a metal substrate. The coating composition also provides economies because the composition can be used with a variety of primers and plastisol gaskets of different chemical types. The closure manufacturer, therefore, can use the coating composition in a more universal range of applications, thereby eliminating the need to stock an inventory of different topcoats and eliminating application equipment changeover.

In accordance with another important aspect of the present invention, a cured coating composition demonstrates excellent flexibility and adhesion with respect to the plastisol sealer gasket. The excellent adhesion between the cured coating composition and the plastisol sealer gasket further improves the vacuum seal between a metal closure and a glass container to maintain product integrity, and the excellent flexibility facilitates processing of the coated metal substrate into a coated metal article, like in molding or stamping process steps, such that the cured coating remains in continuous and intimate contact with the primer on the metal substrate.

In accordance with yet another important aspect of the present invention, the cured coating composition demonstrates an excellent flexibility and adhesion even though the coating composition does not include a halide-containing vinyl polymer. Conventional coating compositions included a polyvinyl chloride to impart flexibility to the cured coating and to provide adhesion to the plastisol gasket. However, the presence of polyvinyl chloride adversely affected the heat resistance of the cured composition. A present coating composition, which excludes a halide-containing vinyl polymer (and glycidyl ether and bisphenol monomers), has excellent heat resistance, and, surprisingly, excellent flexibility.

In accordance with yet another important aspect of the present invention, a primed metal substrate coated on at least one surface with a cured coating composition of the present invention can be formed into a metal closure for a glass or plastic container that holds food products. Conventionally, a particular type of topcoat was applied over a particular primer in order to achieve sufficient intercoat adhesion. The present coating composition overcomes this disadvantage, and provides a cured coating composition that exhibits sufficient intercoat adhesion with a variety of types of primers, and with a variety of types of plastisol sealers.

These and other aspects and advantages of the present invention will become apparent from the following detailed description of the preferred embodiments.

DETAILED DESCRIPTION OF THE PREFERRED EMBODIMENTS

A coating composition of the present invention, after curing, provides a cured coating composition that effectively enhances corrosion inhibition of primed metal substrates, such as, but not limited to, aluminum, iron, steel, and copper. A present coating composition, after curing, also demonstrates excellent adhesion to the primer coat applied to the metal substrate and to a plastisol gasket, excellent chemical and scratch resistance, and excellent flexibility.

Accordingly, a coat between the primer and topcoat, i.e., the middle coat, can be eliminated. The present coating compositions, therefore, are useful in an improved two-coat system comprising a primer and a topcoat. The present coating compositions are especially useful as the topcoat of a two-coat system for the interior of a metal closure for vacuum-packed food products, because the topcoat is free of a vinyl halide-containing polymer, residual bisphenol monomers, and residual glycidyl ether monomers, and provides an effective barrier against the migration of residual bisphenol and glycidyl ether monomers from the size coat.

A present coating composition comprises: (a) an acrylate copolymer having pendant glycidyl groups, typically a glycidyl (meth)acrylate-alkyl (meth)acrylate copolymer, (b) an acid-terminated polyester, and (c) a nonaqueous carrier. A coating composition of the present invention is free of a halide-containing vinyl polymer, formaldehyde, and glycidyl ether and bisphenol monomers, like bisphenol A and BADGE. In addition, a present coating composition can include optional ingredients, like a catalyst or pigment, that improve the esthetics of the composition, that facilitate processing of the composition, or that improve a functional property of the composition. The individual composition ingredients are described in more detail below.

(a) Acrylate Copolymer Having Pendant Glycidyl Groups

The coating composition of the present invention comprises an acrylate copolymer having pendant glycidyl groups in an amount of about 50% to about 90%, and preferably about 55% to about 80%, by weight of nonvolatile material. To achieve the full advantage of the present invention, the coating composition comprises about 60% to about 70% of the acrylate copolymer, by weight of nonvolatile material.

An acrylate copolymer having pendant glycidyl groups that is useful in the present invention contains about 5 to about 50 weight %, and preferably about 10 to about 40 weight %, of a monomer containing a glycidyl group, for example, glycidyl methacrylate. To achieve the full advantage of the present invention, the acrylate copolymer contains about 15 to about 25 weight % of a monomer containing a glycidyl group. Similarly, the alkyl (meth)acrylate is present in the copolymer in an amount of about 50 to about 95 weight %, preferably about 60 to about 90 weight %, and preferably about 75 to about 85 weight %. The copolymer also can contain 0 to 10 weight %, and preferably 0 to 5 weight %, of an optional monounsaturated monomer.

The monomer containing a glycidyl group can be any monomer having a carbon-carbon double bond and a glycidyl group. Typically, the monomer is a glycidyl ester of an α,β-unsaturated acid, or anhydride thereof. The α,β-unsaturated acid can be a monocarboxylic acid or a dicarboxylic acid. Examples of such carboxylic acids include, but are not limited to, acrylic acid, methacrylic acid, ethacrylic acid, α-chloroacrylic acid, α-cyanoacrylic acid, β-methylacrylic acid (crotonic acid), α-phenylacrylic acid, β-acryloxypropionic acid, sorbic acid, α-chlorosorbic acid, angelic acid, cinnamic acid, p-chlorocinnamic acid, β-stearylacrylic acid, itaconic acid, citraconic acid, mesaconic acid, glutaconic acid, aconitic acid, maleic acid, fumaric acid, tricarboxyethylene, maleic anhydride, and mixtures thereof. Specific examples of monomers containing a glycidyl group are glycidyl (meth)acrylate (i.e., glycidyl methacrylate and glycidyl acrylate), mono- and di-glycidyl itaconate, mono- and di-glycidyl maleate, and mono- and di-glycidyl formate. It also is envisioned that allyl glycidyl ether and vinyl glycidyl ether can be used as the monomer.

It also should be pointed out that the acrylate copolymer can initially be a copolymer of an α,β-unsaturated acid and an alkyl (meth)acrylate, which then is reacted with a glycidyl halide or tosylate, e.g., glycidyl chloride, to position pendant glycidyl groups on the acrylate copolymer. The α,β-unsaturated carboxylic acid can be an acid listed above, for example.

In an alternative embodiment, an acrylate copolymer having pendant hydroxyl groups first is formed. The copolymer then is reacted to position pendant glycidyl groups on the acrylate polymer. The acrylate copolymer having pendant hydroxyl groups can be prepared by incorporating a monomer like 2-hydroxyethyl methacrylate or 3-hydroxypropyl methacrylate into the acrylate copolymer.

A preferred monomer containing a glycidyl group is glycidyl (meth)acrylate having the following structure:

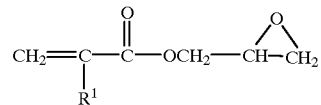

wherein $R^1$ is hydrogen or methyl.

The monomer containing a glycidyl group, or the monomer that contains a group (like carboxyl or hydroxyl) that can be converted to a glycidyl group, is copolymerized with an alkyl (meth)acrylate having the structure:

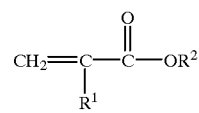

wherein $R^1$ is hydrogen or methyl, and $R^2$ is an alkyl group containing one to sixteen carbon atoms.

The $R^2$ group can be substituted with one or more, and typically one to three, moieties such as hydroxy, halo, amino, phenyl, and alkoxy, for example. The alkyl (meth)acrylates used in the copolymer therefore encompass hydroxy alkyl (meth)acrylates and aminoalkyl (meth)acrylates. The alkyl (meth)acrylate typically is an ester of acrylic or methacrylic acid. Preferably, $R^1$ is methyl and $R^2$ is an alkyl group having two to eight carbon atoms. Most preferably, $R^1$ is methyl and $R^2$ is an alkyl group having two to four carbon atoms. Examples of the alkyl (meth)acrylate include, but are not limited to, methyl, ethyl, propyl, isopropyl, butyl, isobutyl, pentyl, isoamyl, hexyl, 2-aminoethyl, 2-hydroxyethyl, 2-ethylhexyl, cyclohexyl, decyl, isodecyl, benzyl, 2-hydroxypropyl, lauryl, isobornyl, octyl, and nonyl (meth)acrylates.

Optional monounsaturated monomers suitable for copolymerizing with the monomer containing a glycidyl group (or monomer having a group that can be converted to a glycidyl group) and alkyl (meth)acrylate include, but are not limited to vinyl monomers, like styrene, a halostyrene, isoprene, diallylphthalate, divinylbenzene, conjugated butadiene, α-methylstyrene, vinyl toluene, vinyl naphthalene, and mixtures thereof. Other suitable polymerizable vinyl monomers include acrylonitrile, acrylamide, methacrylamide, methacrylonitrile, vinyl acetate, vinyl propionate, vinyl butyrate, vinyl stearate, isobutoxymethyl acrylamide, and the like.

The glycidyl-containing monomer (or precursor thereof), alkyl (meth)acrylate, and optional monounsaturated monomers are polymerized by standard free radical polymerization techniques, e.g., using initiators such as peroxides or peroxy esters, to provide a copolymer having a weight average molecular weight ($M_w$) of about 4,000 to about 50,000, and preferably about 7,500 to about 40,000. To achieve the full advantage of the present invention, the copolymer has an $M_w$ of about 10,000 to about 30,000. In the preparation of the copolymer, a chain transfer agent, such as isopropyl alcohol or n-dodecyl mercaptan, can be used to control the $M_w$ of the polymer.

The following example illustrates a glycidyl (meth)acrylate-alkyl (meth)acrylate copolymer used in the present invention.

EXAMPLE 1

Glycidyl Methacrylate-Ethyl Methacrylate Copolymer

Diisobutyl ketone (123.9 lbs.) was added to a clean reaction vessel equipped with a reflux condenser and blanketed with nitrogen ($N_2$). The diisobutyl ketone was heated to 302° F. A monomer premix containing 396.5 lbs. of ethyl methacrylate, 99.1 lbs. of glycidyl methacrylate, and 19.8 lb. of di-t-butylperoxide was metered into the reactor over a 2.5 to 3 hour time period, while maintaining the temperature of the reaction mixture at 298° F. to 302° F. and under a low to no reflux. After the entire monomer blend was added to the reactor, the reaction mixture was held at 302° F. to 306° F., for two hours, followed by cooling the reaction mixture to 248° F. Then, after adding 188.3 lb. of ethylene glycol monobutyl ether (i.e., butyl cellosolve) to the reaction mixture, the mixture was stirred for 30 minutes. Then, 88.8 lb. of propylene glycol monomethyl ether was added to the reaction mixture. The resulting reaction product contained 55% by weight of the glycidyl methacrylate-ethyl methacrylate copolymer. The reaction product weighed about 8.37 lb./gal. The copolymer contained about 79.5% ethyl methacrylate and 20.5% glycidyl methacrylate. Gas phase chromatography showed that the copolymer had an $M_w$ of about 19,250, and an $M_n$ of about 4,900.

(b) Acid-Terminated Polyester

In addition to the glycidyl methacrylate-alkyl (meth)acrylate copolymer, a present coating composition comprises a polyester to impart flexibility to the cured coating composition. The polyester is present in the composition in an amount of about 10% to about 50%, and preferably about 20% to about 45%, by weight of nonvolatile material. To achieve the full advantage of the present invention, the polyester is present in an amount of about 30% to about 40%, by weight of nonvolatile material.

The polyester has a weight average molecular weight ($M_w$) of about 1,000 to about 50,000, and preferably about 5,000 to about 40,000. To achieve the full advantage of the present invention, the polyester has an $M_w$ of about 10,000 to about 30,000.

The identity of the polyester is not especially limited. However, it is important that the polyester is terminated at each end with carboxylic acid groups. The terminal carboxylic acid groups of the polyester, therefore, are available to react with the oxirane ring of the pendant glycidyl groups of the copolymer, and thereby provide a crosslinked acrylate coating.

The polyesters are prepared from an aromatic or aliphatic polycarboxylic acid and an aliphatic diol, triol, or polyol. These ingredients are reacted to provide a polyester having terminal carboxylic acid groups. Carboxylic acid groups can be positioned at the terminal end of the polyester by utilizing excess dicarboxylic acid in the reaction. A triol or polyol is used to provide a branched, as opposed to linear, polyester. Accordingly, the acid-terminated polyesters have an acid number of about 20 to about 200 mg KOH/g, and preferably about 40 to about 150 mg KOH/g. To achieve the full advantage of the present invention, the polyester has an acid number of 60 to about 100 mg KOH/g. The polyester has a hydroxyl number of about 5 to about 20 mg KOH/g.

Examples of diols, triols, and polyols include, but are not limited to, ethylene glycol, propylene glycol, 1,3-propanediol, glycerol, diethylene glycol, dipropylene glycol, triethylene glycol, trimethylolpropane, trimethylolethane, tripropylene glycol, neopentyl glycol, pentaerythritol, 1,4-butanediol, trimethylol propane, hexylene glycol, cyclohexanedimethanol, a polyethylene or polypropylene glycol having an $M_w$ of about 500 or less, isopropylidene bis(p-phenylene-oxypropanol-2), and mixtures thereof.

Examples of polycarboxylic acids or anhydrides include, but are not limited to, maleic anhydride, maleic acid, fumaric acid, succinic anhydride, succinic acid, adipic acid, phthalic acid, phthalic anhydride, 5-tert-butyl isophthalic acid, tetrahydrophthalic anhydride, hexahydrophthalic anhydride, endomethylenetetrahydrophthalic anhydride, azelaic acid, sebacic acid, tetrachlorophthalic anhydride, chlorendic acid, isophthalic acid, trimellitic anhydride, terephthalic acid, a naphthalene dicarboxylic acid, cyclohexanedicarboxylic acid, glutaric acid, and mixtures thereof. It is also understood that an esterifiable derivative of a polycarboxylic acid, such as a di-methyl ester or anhydride of a polycarboxylic acid, can be used to prepare the polyester.

A typical polyester is illustrated in Example 2. The diol, triol, and polycarboxylic acid and anhydride, in correct proportions, are reacted using standard esterification procedures to provide a polyester having carboxylic acid functionalities at the terminal ends of the polyester.

The following example illustrates an acid-terminated polyester used in the present invention.

EXAMPLE 2

Acid-Terminated Polyester

Neopentyl glycol (125.2 lb.), ethylene glycol (43.1 lb.), trimethylolpropane (21.7 lb.), and isophthalic acid (166.7 lb.) were charged into a reaction vessel as the reaction vessel was heated to 150° F. under a nitrogen (N₂) blanket. After the reactants were introduced into the reaction vessel, the reaction mixture was heated until the onset of water distillation. Heating was continued to maintain the overhead column temperature at less than 205° F. The refractive index of the distillate was monitored to remain at 1.337 or below. If the refractive index increased above 1.337, additional ethylene glycol was added to the reaction mixture to adjust the refractive index to 1.337 or below. Heating was continued until the reaction mixture reached 460° F., then the reaction mixture was held at 450° F. until the acid number was below 8 mg KOH/g. The reaction mixture was cooled to between 350° F. to 365° F., followed by the addition of 62.2 lbs. of trimellitic anhydride. The temperature of the resulting reaction mixture was raised to 435° F. to 438° F. and held for 15 minutes. The acid number of the reaction mixture then was about 70 to about 80 mg KOH/g. The reaction mixture then was cooled to 284° F., followed by the addition of 319.8 lb. of aromatic solvent and 80 lbs. of propylene glycol monomethyl ether. The resulting acid-terminated polyester solution contained 55% by weight nonvolatile matter, and had a weight/gallon of 9.10 lbs./gal. The acid-terminated polyester had a Tg (glass transition temperature) of 2° C., as determined by Differential Scanning Calorimetry (DSC), and an $M_w$ of about 10,800.

Four other acid-terminated polyesters were prepared by the method set forth in Example 2. These polyesters had an $M_w$ of 11,600, 15,800, 6,100, and 25,600, respectively, and a Tg of 15° C., 75° C., 3° C., and 11° C., respectively.

(c) Nonaqueous Carrier

A present coating composition is a nonaqueous composition, wherein the glycidyl methacrylate-alkyl (meth)acrylate copolymer and the acid-terminated polyester are homogeneously dispersed in a nonaqueous carrier. It should be understood that the present coating composition can include a relatively low amount of water, such as up to about 5% by total weight of the composition, without adversely affecting the corrosion-inhibiting coating composition, either prior to or after curing. The water can be added to the composition intentionally, or can be present in the composition inadvertently, such as when water is present in a particular component included in the coating composition.

In general, the nonaqueous carrier has sufficient volatility to evaporate essentially entirely from the coating composition during the curing process, such as during heating at about 350° F. to about 400° F. for about 8 to about 12 minutes. Suitable nonaqueous carriers are known in the art of coating compositions, and include, for example, but are not limited to, glycol ethers, like ethylene glycol monomethyl ether, ethylene glycol monoethyl ether, ethylene glycol monobutyl ether, and propylene glycol monomethyl ether; ketones, like cyclohexanone, ethyl aryl ketones, methyl aryl ketones, and methyl isoamyl ketone; aromatic hydrocarbons, like toluene, benzene, and xylene; aliphatic hydrocarbons, like mineral spirits, kerosene, and high flash VM&P naphtha; alcohols, like isopropyl alcohol, n-butyl alcohol, and ethyl alcohol; and aprotic solvents, like tetrahydrofuran; chlorinated solvents; esters; glycol ether esters, like propylene glycol monomethyl ether acetate; and mixtures thereof.

The nonaqueous carrier usually is included in the composition in a sufficient amount to provide a composition including about 20% to about 80% of (a) and (b), by total weight of the composition. The amount of nonaqueous carrier included in the composition is limited only by the desired, or necessary, rheological properties of the composition. Usually, a sufficient amount of nonaqueous carrier is included in the coating composition to provide a composition that can be processed easily and that can be applied to a metal substrate easily and uniformly, and that is sufficiently removed from the coating composition during curing within the desired cure time.

Therefore, essentially any nonaqueous carrier is useful in the present coating composition as long as the nonaqueous carrier adequately disperses and/or solubilizes the composition components, is inert with respect to interacting with composition components, does not adversely affect the stability of the coating composition or the ability of the corrosion-inhibition coating to inhibit corrosion of a metal substrate, and evaporates quickly, essentially entirely, and relatively rapidly to provide a cured coating composition that inhibits the corrosion of a metal substrate, demonstrates good adhesion and flexibility, and has good chemical and physical properties.

(d) Other Optional Ingredients

A coating composition of the present invention also can include other optional ingredients that do not adversely affect the coating composition or a cured coating composition resulting therefrom. Such optional ingredients are known in the art, and are included in a coating composition to enhance composition esthetics, to facilitate manufacturing, processing, handling, and application of the composition, and to further improve a particular functional property of a coating composition or a cured coating composition resulting therefrom.

Such optional ingredients include, for example, catalysts, dyes, pigments, toners, extenders, fillers, lubricants, anticorrosion agents, flow control agents, thixotropic agents, dispersing agents, antioxidants, adhesion promoters, light stabilizers, and mixtures thereof. Each optional ingredient is included in a sufficient amount to serve its intended purpose, but not in such an amount to adversely affect a coating composition or a cured coating composition resulting therefrom.

One optional ingredient is a catalyst to increase the rate of cure. The catalyst is present in an amount of 0% to about 1%, and preferably about 0.05% to about 1%, by weight of nonvolatile material. Examples of catalysts, include, but are not limited to, quaternary ammonium compounds, phosphorous compounds, and tin and zinc compounds, like a tetraalkyl ammonium halide, a tetraalkyl or tetraaryl phosphonium iodide or acetate, tin octoate, zinc octoate, triphenylphosphine, and similar catalysts known to persons skilled in the art.

Another useful optional ingredient is a lubricant, like a wax, which facilitates manufacture of metal closures by imparting lubricity to sheets of coated metal substrate. A lubricant is present in the coating composition in an amount of 0% to about 2%, and preferably about 0.1% to about 2%, by weight of nonvolatile material.

Another useful optional ingredient is a pigment, like titanium dioxide or a toning phenolic resin. A pigment, like titanium dioxide, is present in the coating composition in an amount of 0% to about 50%, and preferably about 10% to about 50%, by weight of nonvolatile material. A pigment, like a toning phenolic resin, is present in an amount of 0% to about 20%, and preferably about 1% to about 10%, by weight of nonvolatile material.

In accordance with an important feature of the present invention, the present coating composition is free of a halide-containing vinyl polymer, such as polyvinyl chloride. The phrase "free of a halide-containing vinyl polymer" is defined as 1.5% or less of a halide-containing vinyl polymer, by weight of nonvolatile material, as discussed hereafter Conventionally, a polyvinyl chloride was included in the coating composition to improve composition economics and to improve adhesion of a plastisol gasket material to the cured coating composition. However, a halide-containing vinyl polymer adversely affects the heat resistance of the cured coating composition.

The present composition does not include a halide-containing vinyl polymer, yet has sufficient adhesion to a plastisol gasket to avoid failure of a metal closure for food products. In addition, the present composition exhibits an excellent heat resistance.

In accordance with an important feature of the present invention, a halide-containing vinyl polymer is not intentionally added to the coating composition. However, 1.5% or less of halide-containing vinyl polymer, i.e., up to about 1.5%, by weight of nonvolatile material, may be present in the coating composition as an inadvertent ingredient. For example, various resins are dust-coated with a halide-containing vinyl polymer as an additive. Incorporating a dust-coated resin into a present coating composition could introduce a halide-containing vinyl polymer into the composition in an amount of up to 1.5% by weight of nonvolatile material. This amount of a halide-containing vinyl polymer does not adversely affect the cured coating composition.

A present coating composition also is free of phenolic resins and epoxy resins. Accordingly, the composition is free of formaldehyde, and of monomers used in the manufacture of epoxy resin, e.g., bisphenols, like bisphenol A, and glycidyl ether monomers, like BADGE. A present composition, therefore, avoids the environmental and toxicological problems associated with such compounds.

A coating composition of the present invention is prepared by simply admixing the copolymer, the polyester, and any optional ingredients, in any desired order, in the nonaqueous carrier, with sufficient agitation. The resulting mixture is admixed until all the composition ingredients are homogeneously dispersed throughout the nonaqueous carrier. Then, an additional amount of the nonaqueous carrier can be added to the coating composition to adjust the amount of nonvolatile material in the coating composition to a predetermined level.

To demonstrate the usefulness of a coating composition of the present invention, the following examples were prepared, then applied to a metal substrate as a topcoat, and finally cured to provide a coated metal substrate. The coated metal substrates then were tested, comparatively, for use as a closure for a food or beverage container. The cured coatings were tested for an ability to inhibit corrosion of a metal substrate, for adhesion to the metal substrate and to a plastisol gasket, for chemical resistance, for flexibility, and for scratch and mar resistance.

The following Example 3 illustrates one embodiment of a composition of the present invention and its method of manufacture.

EXAMPLE 3

| Ingredient | Weight Amount (lbs.) | % (by weight of the total composition) | % (by weight of nonvolatile material) |
|---|---|---|---|
| Butyl Cellosolve | 225.18 | 27.27% | — |
| Acrylate Copolymer[1] | 420.34 | 50.91% | 70% |
| Polyester[2] | 180.14 | 21.82% | 30% |

[1] the glycidyl methacrylate-ethyl methacrylate of Example 1, containing about 55% by weight of nonvolatile material; and
[2] the polyester of Example 2, containing about 55% by weight of nonvolatile material.

The composition of Example 3 was prepared by adding the acrylic copolymer and the polyester to the butyl cellosolve portion of the solvent, stirring until homogeneous, then adding the remainder of the solvent. The resulting coating composition contained 40% by weight nonvolatile material and weighed 8.26 lb./gal. The makeup of the 60% by weight of solvents is 7.0% propylene glycol monomethyl ether, 38.0% ethylene glycol monobutyl ether (i.e., butyl cellosolve), 7.9% aromatic solvent, and 7.1% diisobutyl ketone. The coating composition of Example 3 was applied as a topcoat to a metal substrate over a primer, then cured for a sufficient time at a sufficient temperature, such as for about 8 to about 12 minutes at about 350° F. to about 400° F., to provide an adherent, crosslinked, cured coating composition on the metal substrate.

A major function of the cured coating composition of Example 3 is to provide a coating layer that: (1) enhances corrosion inhibition of the metal substrate, and (2) provides a coating capable of adhering to the plastisol gasket. The composition of Example 3 provides a barrier against migration of monomers like bisphenol A and BADGE, or formaldehyde, or vinyl polymers when applied over conventional epoxy/phenolic primer coatings.

Conventionally, the primer provides sufficient corrosion-inhibiting properties to adequately protect the metal substrate. However, corrosion inhibition occasionally was insufficient when only one topcoat was applied over the cured primer. Therefore, two topcoats often were used (i.e., a three-coat system). Primers also do not have sufficient adhesion to a plastisol gasket to secure the gasket in place during closure manufacture or food processing.

A coating composition of the present invention, after curing, exhibits excellent chemical and physical properties, exhibits sufficient adhesion to the primer coat to obviate the second topcoat for all except the very aggressive foods packaged in a container, and enhances corrosion inhibition provided by the primer. The present composition also provides excellent adhesion to the plastisol gasket. In addition, the cured coating composition provided by a coating composition of the present invention is sufficiently adhesive to a variety of different types of primer coats and plastisol gaskets, such that the coating composition can be used in a more universal,range of applications.

The coating composition of Example 3 also provided a cured coating composition that exhibited excellent flexibility. Flexibility is an important property of a cured coating composition because the metal substrate is coated with a primer and topcoat prior to stamping or otherwise shaping the metal substrate into a desired metal article, such as a metal container or a metal closure for bottles. The plastisol gasket, if present, is applied over the topcoat during the stamping process.

The coated metal substrate undergoes severe deformations during the shaping process, and if a cured coating composition lacks sufficient flexibility, the coating can form cracks, or fractures. Such cracks result in corrosion of the metal substrate because the aqueous contents of the container or bottle have greater access to the metal substrate. In addition, a cured coating composition provided by a composition of the present invention is sufficiently adhered to the primer during processing into a metal article, thereby further enhancing corrosion inhibition.

The above-described advantages make a coating composition of the present invention useful for application on the interior surface of a variety of metal articles, such as for the interior of vacuum-packed metal containers. The present coating composition is especially useful, after curing, as a corrosion-inhibiting coating on a metal closure for glass or plastic containers that hold food products, like baby food, or food products including volatile acids, like relishes, pickles, and hot peppers.

The compositions of the following Examples 4 through 8 were prepared by the general method outlined above in Example 3. The compositions of Examples 4 through 8 then were applied to a metal substrate as a topcoat over a primer, and cured. The resulting coatings were tested for a variety of properties, and compared to a control composition.

The composition of Examples 4–8 were applied to electrolytic tin plate panels in a sufficient amount to provide 15 mg (milligrams) of cured coating composition per 4 sq. in. (square inches) of panel surface. The compositions of Examples 4–8 were applied over a commercial epoxy-phenolic primer coat. After application to the metal panel, the composition of Examples 4–8 were cured for 8 minutes at 370° F. The compositions of Examples 4–8 were compared to a commercial topcoat composition used on the interior of metal closure, i.e., a polyvinyl chloride-based composition, which also contains a phenolic resin and a pigment. The control composition was applied at a rate of 35 mg per 4 sq. in. of the panel.

|  | Exhibit 4 | Exhibit 5 | Exhibit 6 | Exhibit 7 | Exhibit 8 |
| --- | --- | --- | --- | --- | --- |
| Glycidyl methacrylate-ethyl methacrylate copolymer | 37.5%[1] | 35.0% | 32.5% | 30.0% | 25.0% |
| Acid-terminated polyester | 12.5% | 15.0% | 17.5% | 20.05 | 25.0% |
| % Nonvolatile material | 50% | 50% | 50% | 50% | 50% |
| Copolymer/Polyester ratio | 75/25 | 70/30 | 65/35 | 60/40 | 50/50 |

[1]percent by weight in the composition.

After curing the coating compositions, the panels coated with either the compositions of Examples 4–8 or the control composition were fabricated into metal closures. Tests showed that the compositions of Examples 4–8 passed fabrication of the closures, integrity requirements at elevated temperatures, and compound adhesion tests.

Neither the control nor Examples 4–8 exhibited adhesion failure. In addition, none of the examples exhibited blocking failure. The cured coatings also were subjected to methyl ethyl ketone (MEK) rubs. The MEK rub test measures resistance of a cured coating to chemical attack. In the MEK rub test, cheesecloth saturated with MEK is rubbed back and forth against a coated panel using hand pressure. A rub back and forth is designated as one "double rub." In this test, the cured coating is rubbed until the MEK dissolves or otherwise disrupts the cured coating. A cured coating is less susceptible to chemical attack as the number of MEK double rubs increases. The cured coating of Examples 4–8 required 35 to 48 double rubs before the topcoat was broken through. In contrast, the cured control composition broke through after only seven double MEK rubs, even through the control composition was applied at greater than twice the amount of Examples 4–8. These results show that a cured coating composition of the present invention has excellent resistance to chemical attack compared to the control composition, and can be used as the coating for the interior surface of a food or beverage container.

Closures having Examples 4–8 and the control composition as the topcoat were subjected to an accelerated corrosion test by contact with a 5% by weight acetic acid solution for 30 days and 60 days at 100° F. The results are tabulated below:

|  | Pitting After 30 Days (Avg.) | Pitting After 60 Days (Avg.) |
| --- | --- | --- |
| Control | 1.7 | 20.7[1] |
| Example 4 | 3 | 4.3 |
| Example 5 | 3.7 | 15 |
| Example 6 | 7.7 | 11 |
| Example 7 | 6.7 | 10.7 |
| Example 8 | 10.7 | 12.7 |

[1]a continuous line of corrosion was observed at the coating-gasket interface.

The data summarized above shows that the coating compositions of the present invention out-performed the control composition. In addition, only minor differences in performance were observed by varying the ratio of acrylic copolymer to acid-terminated polyester.

This accelerated corrosion test was repeated using Example 3 at a rate of 15 and 25 mg/4 sq. in. and cured for 8 minutes at 350° F. and 370° F. The results are summarized below:

| Cure Temp. | Film Weight (mg/4 sq. in.) | 30-day Test[1] | 60-day Test |
| --- | --- | --- | --- |
| 370 | 15 | 10.5 | 33 |
| 350 | 15 | 9 | 10.8 |
| 370 | 25 | 0.5 | 19.5 |
| 350 | 25 | 4.8 | 25.8 |

[1]average number of pits over six replicate tests.

The results show that Example 3 performed well as a topcoat for a closure.

The composition of Example 3 was applied to electrolytic tin plate and tin-free steel at a rate of 15 mg/4 sq. in. and cured at 370° F. for 8 minutes. The coated metal then was formed into 51 mm and 63 mm closures. The closures then were subjected to a variety of tests to determine the suitability of the coating composition as a topcoat for a closure. The closures were rated on a subjective scale of 0 (best) to 10 (worst). A closure passes a particular test if the rating is 5 or less. A rating of 2 is equal to a rating for the control composition. In some instances, the tests are rated with respect to degree of failure.

In particular, various products were packaged in a glass container at 180° F. and immediately sealed with a metal closure. The sealed containers were exposed to food processing conditions, like pasteurization for 30 minutes at 180° F. The containers then were cooled and examined for integrity. The containers also were tested for adhesion of the gasket to the coating.

The present coating compositions passed the cross hatch adhesion test, acetic acid tests, sulfur dioxide tests, cystiene hydrochloride tests, and empty container and water-filled adhesion tests.

The properties demonstrated by a coating composition of the present invention, and a cured coating composition resulting therefrom, show that a halide-containing vinyl polymer is not necessary to provide adhesion to a primer coat or a plastisol gasket. The present coating also acts as an effective barrier against migration of formaldehyde, glycidyl ether monomers, and bisphenol monomers from the interior size coat of the closure. The present coating composition, therefore, is useful as a topcoat on the interior of metal closures, and especially metal closures for food and beverage containers. The elimination of the halide-containing vinyl polymer is important with respect to eliminating the environmental and toxicological concerns associated with such polymers. Surprisingly, the halide-containing vinyl polymer has been eliminated, and the present composition maintains the advantageous physical and chemical properties associated with compositions including a halide-containing vinyl polymer. The present compositions also overcome the environmental and toxicological problems associated with prior epoxy-phenolic-based coatings by eliminating formaldehyde, glycidyl ether monomers, and bisphenol monomers from the composition, and by providing an effective barrier against migration of such monomers from the interior size coat.

The present coating composition can be used in conjunction with a variety of types of primers and plastisol gaskets. The present coating composition, therefore, has a more universal range of applications. The present coating compositions, unlike prior compositions, do not require a pigment, like $TiO_2$, to achieve sufficient performance and film integrity. The performance characteristics of the present coating composition is achieved by a novel combination of ingredients, as opposed to halide-containing vinyl polymers and pigments. The cured coating composition also has a high gloss and tooling wear is reduced during manufacture of the metal closure. These and the above-described advantages make a coating composition of the present invention especially useful for application on the interior surface of a metal closure for food and beverage containers.

Obviously, many modifications and variations of the invention as hereinbefore set forth can be made without departing from the spirit and scope thereof, and, therefore, only such limitations should be imposed as are indicated by the appended claims.

What is claimed is:

1. A coating composition for application to a primed metal substrate comprising:
   (a) about 50% to about 90%, by weight of nonvolatile material, of an acrylate copolymer having pendant glycidyl groups, wherein the acrylate copolymer comprises (i) a monomer unit containing a glycidyl group and (ii) an alkyl (meth)acrylate monomer unit;
   (b) about 10% to about 50%, by weight of nonvolatile material, of an acid-terminated polyester having a molecular weight of at least 10,000; and
   (c) a nonaqueous carrier.

2. The coating composition of claim 1 wherein the composition is free of a halide-containing vinyl polymer.

3. The composition of claim 1 wherein the weight ratio of monomer unit containing a glycidyl group to alkyl (meth) acrylate monomer unit in the copolymer is about 1:20 to about 1:1.

4. The composition of claim 1 wherein the acrylate copolymer is prepared by copolymerizing a monomer containing a glycidyl group and an alkyl-(methacrylate).

5. The composition of claim 4 wherein the monomer containing a glycidyl group is selected from the group consisting of (a) allyl glycidyl ether; (b) vinyl glycidyl ether; (c) a glycidyl ester of $\alpha$, $\beta$-unsaturated carboxylic acid selected from the group consisting of acrylic acid, methacrylic acid, ethacrylic acid, $\alpha$-chloroacrylic acid, $\alpha$-cyanoacrylic acid, $\beta$-methylacrylic acid (crotonic acid), $\alpha$-phenylacrylic acid, $\beta$-acryloxypropionic acid, sorbic acid, $\alpha$-chlorosorbic acid, angelic acid, cinnamic acid, p-chlorocinnamic acid, $\beta$-stearylacrylic acid, itaconic acid, citraconic acid, mesaconic acid, glutaconic acid, aconitic acid, maleic acid, fumaric acid, tricarboxyethylene, and maleic anhydride; and (d) mixtures thereof.

6. The composition of claim 4 wherein the composition includes about 10% to about 50%, by weight of nonvolatile material, of a pigment.

7. The composition of claim 4 wherein the composition includes a pigment and the pigment is titanium dioxide.

8. The composition of claim 1 wherein the acrylate copolymer is prepared by copolymerizing a monomer containing a moiety capable of conversion to a glycidyl group and an alkyl (meth)acrylate, followed by conversion of the moiety to a glycidyl group.

9. The composition of claim 8 wherein the monomer containing a moiety capable of conversion to a glycidyl group is selected from the group consisting of acrylic acid, methacrylic acid, ethacrylic acid, $\alpha$-chloroacrylic acid, $\alpha$-cyanoacrylic acid, $\beta$-methylacrylic acid (crotonic acid), $\alpha$-phenylacrylic acid, $\beta$-acryloxypropionic acid, sorbic acid, $\alpha$-chlorosorbic acid, angelic acid, cinnamic acid, p-chlorocinnamic acid, $\beta$-stearylacrylic acid, itaconic acid, citraconic acid, mesaconic acid, glutaconic acid, aconitic acid, maleic acid, fumaric acid, tricarboxyethylene, maleic anhydride, 2-hydroxyethyl methacrylate, 3-hydroxypropyl methacrylate, and mixtures thereof.

10. The composition of claim 1 containing about 20% to about 80%, by total weight of the composition, of (a) and (b).

11. The coating composition of claim 1 further comprising 0% to about 2%, by weight of nonvolatile material, of a lubricant, and 0% to about 50%, by weight of nonvolatile material, of a pigment.

12. The coating composition of claim 1 further comprising 0% to about 1%, by weight of nonvolatile material, of a catalyst.

13. The coating composition of claim 12 wherein the catalyst is selected from the group consisting of a tetraalkyl ammonium halide, a tetraalkyl phosphonium halide, a tetraalkyl phosphonium acetate, a tetraaryl phosphonium halide, a tetraaryl phosphonium acetate, tin octoate, zinc octoate, a triaryl phosphine, and mixtures thereof.

14. The coating composition of claim 1 comprising about 55% to about 80%, by weight of nonvolatile material, of the acrylate copolymer.

15. The composition of claim 1 wherein the acrylate copolymer has a weight average molecular weight of about 4,000 to about 50,000.

16. The composition of claim 1 wherein the acrylate copolymer comprises about 10% to about 40% of a monomer unit having a pendant glycidyl group and about 60% to about 90% of an alkyl (meth)acrylate monomer unit.

17. The composition of claim 16 wherein the acrylate copolymer further comprises 0% to about 10% of an additional monounsaturated monomer unit.

18. The composition of claim 17 wherein the additional monounsaturated monomer is selected from the group consisting of a vinyl monomer, styrene, a halostyrene, α-methylstyrene, vinyl toluene, vinyl naphthalene, acrylonitrile, acrylamide, methacrylamide, methacrylonitrile, vinyl acetate, vinyl propionate, vinyl butyrate, vinyl stearate, isobutoxymethyl acrylamide, and mixtures thereof.

19. The composition of claim 1 wherein the alkyl (meth) acrylate has a formula

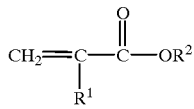

wherein $R^1$ is hydrogen or methyl, and $R^2$ is an alkyl group having one to sixteen carbon atoms.

20. The composition of claim 19 wherein $R^2$ is selected from the group consisting of methyl, ethyl, propyl, isopropyl, butyl, isobutyl, pentyl, isoamyl, hexyl, 2-aminoethyl, 2-hydroxyethyl, 2-ethylhexyl, cyclohexyl, decyl, isodecyl, benzyl, 2-hydroxypropyl, lauryl, isobornyl, octyl, and nonyl.

21. The composition of claim 19 wherein the alkyl (meth)acrylate is ethyl (meth)acrylate.

22. The composition of claim 1 comprising about 20% to about 45%, by weight of nonvolatile material, of the acid-terminated polyester.

23. The composition of claim 1 wherein the acid-terminated polyester has a molecular weight of about 10,000 to about 50,000.

24. The composition of claim 1 wherein the polyester has a molecular weight of about 10,000 to about 40,000.

25. The composition of claim 1 wherein the acid-terminated polyester has an acid number of about 20 to about 200.

26. The composition of claim 1 wherein the acid-terminated polyester is prepared from a diol or triol selected from the group consisting of ethylene glycol, propylene glycol, 1,3-propanediol, glycerol, diethylene glycol, dipropylene glycol, triethylene glycol, trimethylolpropane, trimethylolethane, tripropylene glycol, neopentyl glycol, pentaerythritol, 1,4-butanediol, trimethylol propane, hexylene glycol, cyclohexanedimethanol, polyethylene and polypropylene glycols having $M_w$ of about 500 and less, isopropylidene bis(p-phenylene-oxypropanol-2), and mixtures thereof.

27. The composition of claim 1 wherein the acid-terminated polyester is prepared from a polycarboxylic acid or anhydride selected from the group consisting of maleic anhydride, maleic acid, fumaric acid, succinic anhydride, succinic acid, adipic acid, phthalic acid, phthalic anhydride, 5-tert-butyl isophthalic acid, tetrahydrophthalic anhydride, hexahydrophthalic anhydride, endomethylenetetrahydrophthalic anhydride, azelaic acid, sebacic acid, tetrachlorophthalic anhydride, chlorendic acid, isophthalic acid, trimellitic anhydride, terephthalic acid, a naphthalene dicarboxylic acid, cyclohexanedicarboxylic acid, glutaric acid, and mixtures thereof.

28. The composition of claim 1 wherein the acid-terminated polyester is prepared from a diol or triol selected from the group consisting of ethylene glycol, trimethylolpropane, neopentyl glycol, and mixtures thereof; and a polycarboxylic acid selected from the group consisting of isophthalic acid, trimellitic anhydride, and a mixture thereof.

29. The composition of claim 1 wherein the composition includes up to about 1.5%, by weight of nonvolatile material, of a halide-containing vinyl polymer.

30. A coating composition for application to a primed metal substrate comprising:

(a) about 60% to about 70%, by weight of nonvolatile material, of a glycidyl (meth)acrylate-alkyl (meth) acrylate copolymer containing about 15% to about 25% by weight of glycidyl methacrylate monomer unit;

(b) about 30% to about 40%, by weight of nonvolatile material, of an acid-terminated polyester having a weight average molecular weight of about 10,000 to about 30,000; and (c) a nonaqueous carrier, wherein the composition is free of a halide-containing vinyl polymer.

31. The composition of claim 30 further comprising about 0% to about 2% of a lubricant, about 10% to about 50% of a pigment, and 0% to about 1% of a catalyst, each by weight of nonvolatile material.

* * * * *